UNITED STATES PATENT OFFICE.

CARLETON ELLIS, OF MONTCLAIR, NEW JERSEY.

DETOXICATING OIL AND THE LIKE.

1,132,710. Specification of Letters Patent. Patented Mar. 23, 1915.

No Drawing. Application filed August 15, 1913. Serial No. 784,909.

*To all whom it may concern:*

Be it known that I, CARLETON ELLIS, a citizen of the United States, and resident of Montclair, in the county of Essex and State of New Jersey, have invented certain new and useful Improvements in Detoxicating Oil and the like, of which the following is a specification;

This invention relates to a process of treating composite animal and vegetable oils and the like which normally contain catalyzer poisons or bodies exerting a depressing or inhibiting effect on the activity of the catalyzers.

Many oils contain traces of sulfur, phosphorus, arsenic, cyanid derivatives, chlorin and other bodies more or less toxic to certain types of catalyzers, which toxic bodies are oftentimes present in oils and fats in such minute traces as to be scarcely detected by analysis, yet being present in an amount sufficient to inhibit or utterly destroy the activity of catalytic bodies. Ordinary refining processes do not usually remove these toxic bodies in a satisfactory manner, although in some cases a fairly complete removal is secured, but oftentimes the refining process conducted as it usually is to remove coloring matter and albumins, not only does not throw down all the catalyzer toxins, but sometimes even introduces traces of chlorin or other undesirable bodies.

The traces of catalyzer poisons cause much trouble and loss in hydrogenation, not only by reducing the life of the catalyzer but by making its activity so uncertain that the output of a plant may vary from day to day and cause much perplexity and annoyance because of the uncertainty of the operation.

My invention has to do with the elimination of these bodies or partial or complete reduction of their action and in the preferred form it involves the treatment of the oil or fat with a metallic body or metalliferous compound capable of reacting with or absorbing a part or whole of the poison, so that by filtration the oil may be more or less freed from traces of toxic bodies. In carrying out this step I may add to the material to be detoxicated a metal such as sodium, calcium, aluminium, nickel, iron, copper, zinc and the like or other oxids or suboxids and hydrates or other metalliferous material preferably in a finely divided or colloidal form, preferably heating the oil and stirring or grinding same with the detoxicator, as the toxin remover or eliminant may be termed, until the desired combination or occlusion of the poison has occurred. The oil may then be filtered to remove the detoxicator and accumulated poison, catalyzer added to the oil and hydrogen or hydrogen-containing gas passed into the oil until the latter has been hardened to the desired consistency. The temperature, pressure of the gas and the like are to be regulated with reference to the nature of the oil treated and the catalyzer employed in the manner well known in the art. From say one per cent. or so of the detoxicator may be used, the proportion to be regulated by the character of the oil. When the latter is strongly acid through the presence of fatty acids, soaps may form which dissolve in the oil and these may be decomposed by boiling with aqueous mineral acids such as hydrochloric acid. The temperature may be regulated under ordinary conditions of operation as the detoxicator action of reaction usually is facilitated by the application of heat, temperatures between 100 and 200° C. being the most desirable range, and 170-190° C. usually being the desirable limits with heavy metal detoxicators, especially when neutral oil is being treated. When the oil is rather highly acid lower temperatures are often preferable.

The metal detoxicator should, as stated, be in a finely divided condition as it is important to secure a very large surface for exposure to so viscous a liquid as an oil, especially when it is necessary to remove such minute traces. A fine or extended condition of the metal or other detoxicators is, moreover, important and it is also desirable to bring the finely divided material into thorough contact with the oil as by stirring forcibly, or by grinding or other similar treatment. A metallic condition of the detoxicator is generally speaking more satisfactory than the compound state as the oxid or hydrate. Metals may be put into a finely divided condition by atomization. Oxids, hydrates, carbonates and the like may be reduced by heating in the presence of hydrogen, water gas, hydrocarbon vapors and the like and thus the metal is obtained in a very finely divided condition. Fullers' earth and pumice ground to fine dust may be treated with a solution of the metal and the reduction then caused to take place, thus spreading and extending the detoxicator to a desirable degree.

The mixture of the metal and its oxids or other compounds may be used, or of one metal with the oxid of another metal or two metals may be mixed as, for example, metal and aluminium. The catalyzer which is spent, that is to say, has lost its efficiency as a catalytic agent in oil hardening processes, may be used as a toxin absorbing or occluding agent as it is yet effective for such purposes after its catalytic properties are lost. This is especially true of a catalyzer which has been injured by oxidation rather than by toxic action, such oxidation perhaps occurring through the presence of oxygen in the hydrogen gas used for the oil hardening operation.

As an illustrative example of the present process fish or whale oil containing sulfur, phosphorus and chlorin is heated to 170° C., one-half of one per cent. of aluminium powder added (for chlorin) and the oil violently stirred for one half hour. One per cent. of spent catalyzer consisting of 20–30% of nickel carried on fullers' earth or on kieselguhr is then added, the temperature raised to 180° C. and the mixture stirred for three hours or so. It is then run through a filter press and the aluminium and nickel material removed. The oil may then be pumped into the hydrogenation apparatus, a good quality of nickel catalyzer or other catalytic material added, hydrogen introduced and the oil suitably hardened. Or, the active nickel or other catalyzer may be introduced without removal of the detoxicator if it be unnecesary to keep this separate. This, however, is not usually a desirable practice. In the case of oils which are heavily charged with albumin and mucins, treatment with one-half of one per cent. of formaldehyde gas or solution is desirable before detoxication in accordance with the foregoing.

Treatment of the oil with the fine particles of material or other detoxicating material suspended in oil by vigorous stirring, etc., and maintained under proper thermal conditions gives a rapidity of treatment and thoroughness of detoxication which is not readily secured by filtering through a porous bed of detoxicator or by attaching the latter as a coating to paddles or vanes which are revolved in the oil to be treated. It appears that the peculiar action of detoxicator to be wholly effective requires a material in a very fine state of division in order to accomplish highly satisfactory results with bodies of the viscosity of oils and fats. Where the terms oil and fat are used throughout this specification they are synonymous and the terms detoxicator and detoxication refer respectively to materials capable of removing small or minute quantities of toxic materials and to the process of such removal.

To recapitulate, my invention is concerned with or involves treating oils and fats containing catalyzer poisons usually present only as traces, not generally eliminated completely by the usual refining processes, which treatment comprises adding to the oil or fat a detoxicating material preferably a finely divided or pulverulent material or metalliferous material having an affinity for said poisons, but preferably substantially without other effect or action on the oil or fat, preferably suspending the detoxicator in the oily medium as by rapid stirring, preferably heating between 100 and 200° C. and continuing such conditions until the poison is absorbed by the detoxicator to the degree desired or necessary, then if desired introducing active catalytic material and hydrogen so as to harden the oil to the required consistency, the detoxicator preferably being removed before the addition of the active catalytic material; and further in the application of used catalyzer which has lost its catalytic activity through one cause or another, as a poison absorbing or occluding agent in the conduct of the present process.

What I claim is:

1. The process of treating oil, fat and the like, comprising exposing the same to the action of a spent catalyzer in the absence of hydrogen whereby bodies injurious to catalyzers are removed therefrom.

2. The process of treating oil, fat and the like, comprising exposing the same to the action of a spent metallic catalyzer in the absence of hydrogen whereby bodies injurious to metallic catalyzers are removed therefrom and separating the spent catalyzer from the treated material.

3. The process of treating oil, fat and the like, which consists in exposing the same to the action of a spent catalyzer in the absence of hydrogen, to combine with or absorb catalyzer poisons and then to the action of an active catalyzer in the presence of hydrogen.

4. The process of treating oil, fat and the like, which consists in exposing the same to the action of a spent catalyzer previously employed in hydrogenation to combine with or absorb catalyzer poisons, separating the spent catalyzer from the treated material and then subjecting such material to the action of an active catalyzer in the presence of hydrogen.

5. The process of treating oil, fat and the like, which consists in exposing the same to the action of a spent catalyzer in the absence of hydrogen to combine with or absorb catalyzer poisons, separating the spent catalyzer from the treated material and then contacting such material with an active catalyzer in the presence of hydrogen.

Signed at Montclair in the county of Essex and State of New Jersey this 14th day of August A. D. 1913.

CARLETON ELLIS.

Witnesses:
  B. M. ELLIS,
  F. CORBETT.